(12) United States Patent
Fujishima

(10) Patent No.: US 7,120,288 B2
(45) Date of Patent: Oct. 10, 2006

(54) ACCURACY ANALYZING APPARATUS FOR MACHINE TOOL

(75) Inventor: Makoto Fujishima, Yamatokoriyama (JP)

(73) Assignees: Mori Seiki Co., Ltd., Nara (JP); Intelligent Manufacturing Systems International, Sacramento, CA (US)

( * ) Notice: Subject to any disclaimer, the term of this patent is extended or adjusted under 35 U.S.C. 154(b) by 841 days.

(21) Appl. No.: 10/337,843

(22) Filed: Jan. 8, 2003

(65) Prior Publication Data

US 2003/0133131 A1    Jul. 17, 2003

(30) Foreign Application Priority Data

Jan. 15, 2002   (JP) .............................. 2002-006260

(51) Int. Cl.
*G06K 9/00*      (2006.01)
(52) U.S. Cl. ........................................ 382/152; 348/94
(58) Field of Classification Search ................ 382/152, 382/291; 348/94, 95
See application file for complete search history.

(56) References Cited

U.S. PATENT DOCUMENTS

| | | | | |
|---|---|---|---|---|
| 4,018,113 A | * | 4/1977 | Blazenin et al. .............. 82/118 |
| 5,029,097 A | * | 7/1991 | Michigami et al. ......... 700/193 |
| 5,677,768 A | * | 10/1997 | Bockman ..................... 356/487 |

OTHER PUBLICATIONS

Patent Abstracts of Japan, Publication No. 04-082651, dated Mar. 16, 1992.
Patent Abstracts of Japan, Publication No. 10-138097, dated May 26, 1998.

\* cited by examiner

*Primary Examiner*—Phuoc Tran
(74) *Attorney, Agent, or Firm*—Westerman, Hattori, Daniels & Adrian, LLP.

(57) ABSTRACT

The present invention relates to an accuracy analyzing apparatus which is capable of efficiently analyzing accuracies of a machine tool including the perpendicularity of a spindle axis and the thermal displacement of a spindle with a higher level of accuracy at lower costs. The accuracy analyzing apparatus (1) comprises a laser oscillator (2) attached to the spindle (26) for emitting a laser beam having a light axis perpendicular to the spindle axis, an imaging device (5, 8) having a light receiving section (5) disposed in the vicinity of the laser oscillator (2) for receiving the laser beam from the laser oscillator (2) by the light receiving section (5) and generating two-dimensional image data, and an analyzer (15) for analyzing the accuracies of the machine tool (20) on the basis of the generated image data.

7 Claims, 6 Drawing Sheets

ACCURACY ANALYZING APPARATUS FOR MACHINE TOOL

BACKGROUND OF THE INVENTION

1. Field of the Invention

The present invention relates to an accuracy analyzing apparatus for a machine tool having a feed mechanism for relatively moving a table and a spindle along orthogonal three axes including a first axis extending along a spindle axis and second and third axes perpendicular to each other and perpendicular to the first axis, the accuracy analyzing apparatus being adapted to analyze the perpendicularity of a spindle axis with respect to the second axis and/or the third axis and the thermal displacement of the spindle.

2. Description of the Prior Art

The perpendicularity of a spindle axis directly affects the machining accuracy and, therefore, is usually checked and adjusted to satisfy a predetermined reference value before being shipped from a machine tool maker to a user.

A conventional method for checking the perpendicularity is as follows. A straightedge is attached to a table to be fed by a feed mechanism, and a dial indicator is attached to a spindle. While the spindle is moved along a first axis with one of two measuring surfaces of the straightedge positioned along a second or third axis, measurements are taken on the other measuring surface of the straightedge by means of the dial indicator.

When the spindle is rotated, bearings rotatably holding the spindle generate heat due to rolling of rolling elements thereof, so that the spindle is liable to be displaced (or extended) along the spindle axis by the generated heat thereby to cause a machining error. For correction for the thermal displacement, it is a conventional practice to measure a temperature around the spindle and estimate the thermal displacement (extension) amount along the spindle axis on the basis of the measured temperature.

However, the analysis of the perpendicularity of the spindle axis and the estimation of the thermal displacement amount of the spindle cannot be achieved by a single apparatus as can be understood from the above description. Therefore, separate apparatuses should be provided for the analysis and the estimation. This leads to lower efficiency and higher costs.

Since the thermal displacement of the spindle is estimated on the basis of the temperature measured around the spindle but not the temperature of the spindle itself, the estimation of the thermal displacement amount is not always accurate.

In view of the foregoing, it is an object of the present invention to provide an accuracy analyzing apparatus which is capable of highly efficiently analyzing the accuracies of a machine tool including the perpendicularity of a spindle axis and the thermal displacement of a spindle with a higher level of accuracy at lower costs.

SUMMARY OF THE INVENTION

According to the present invention to achieved the aforesaid object, there is provided an accuracy analyzing apparatus for a machine tool comprising a table, a spindle and a feed mechanism for relatively moving the table and the spindle along orthogonal three axes including a first axis extending along a spindle axis and second and third axes perpendicular to each other and perpendicular to the first axis, the apparatus comprising: light projecting means attached to the spindle for emitting a light beam having a light axis perpendicular to the spindle axis; imaging means having a light receiving section disposed in the vicinity of the light projecting means for receiving the light beam emitted from the light projecting means by the light receiving section and generating two-dimensional image data; and analyzing means for analyzing an accuracy of the machine tool on the basis of the generated image data.

According to the accuracy analyzing apparatus, the light projecting means attached to the spindle of the machine tool, and the light beam having the light axis perpendicular to the spindle axis is emitted from the light projecting means. The emitted light beam is received by the light receiving section, and image data including density level data having a two-dimensional array configuration is generated by the imaging means.

A preferred example of the imaging means is a CCD camera including a plurality of photoelectric converting elements arranged in a two-dimensional array defined by plural lines and plural rows as the light receiving section. The CCD camera digitizes voltage signals outputted from the respective photoelectric converting elements according to received light amounts, and then converts the digitized voltage signals into density levels, which are in turn outputted as two-dimensional density image data having the same array configuration as the array of the photoelectric converting elements.

Since the light beam emitted from the light projecting means has a round cross section, a two-dimensional density image obtained by the imaging means includes a round image portion having a lower density level. The analyzing means binarizes the data of the two-dimensional density image obtained by the imaging means on the basis of a predetermined threshold level to extract the image portion corresponding to the emitted light beam, and analyzes the extracted binary image portion to analyze the accuracies of the machine tool. The light projecting means is preferably a laser oscillator which emits a laser beam, because the laser beam is excellent in linearity and convergence.

When the machine tool is operated for a predetermined period, for example, the spindle is liable to be displaced or extended along the axis thereof due to heat generation of bearings. With the spindle extended, the center position of a binary image obtained before the thermal displacement and the center position of a binary image obtained after the thermal displacement are offset from each other axially of the spindle according to the thermal displacement. Therefore, the analyzing means computes the center positions of the binary images respectively obtained before the operation of the machine tool and after a lapse of the predetermined period from the start of the operation of the machine tool, and then calculates a difference between the center positions along the spindle axis for analyzing the thermal displacement of the spindle.

The accuracy analyzing apparatus according to the present invention is adapted to directly measure the displacement of the spindle and, therefore, capable of highly accurately analyzing the (thermal) displacement of the spindle and correspondingly making a correction for the (thermal) displacement with a higher level of accuracy.

The imaging means may include at least one pair of light receiving sections which are disposed in opposed relation across the light projecting means. In this case, the analyzing means may be adapted to detect the perpendicularity of the spindle axis with respect to the second axis and/or the third axis.

For example, it is assumed that the spindle axis extending along the first axis is not perpendicular to the second axis. In this case, the two light receiving sections disposed in opposed relation across the light projecting means each have a light receiving surface oriented perpendicularly to the second axis and parallel to the third axis. The light beam is first emitted toward one of the light receiving sections of the imaging means from the light projecting means, and received by the one light receiving section. Then, the spindle is rotated by 180 degrees, and the light beam emitted from the light projecting means is received by the other light receiving section of the imaging means. The center position of a binary image obtained by the one light receiving section and the center position of a binary image obtained by the other light receiving section are offset from each other perpendicularly to the third axis according to the inclination of the spindle axis.

The analyzing means calculates the offset amount, and analyzes the perpendicularity of the spindle axis with respect to the second axis on the basis of the calculated offset amount and a distance between the light receiving surfaces of the two light receiving sections. That is, it is possible to calculate the inclination angle of the spindle axis. The inclination angle θ of the spindle axis is determined from the following expression:

$$\theta = \tan^{-1}(d/L)$$

wherein d is the offset amount, and L is the distance between the light receiving surfaces of the light receiving sections.

The aforesaid process is also applicable to a case where the spindle axis is not perpendicular to the third axis. In this case, the two light receiving sections each have a light receiving surface oriented perpendicularly to the third axis and parallel to the second axis. The analyzing means calculates the inclination angle of the spindle axis with respect to the third axis on the basis of binary images obtained from the respective light receiving sections of the imaging means. Further, where the perpendicularities of the spindle axis with respect to the second and third axes are analyzed, the imaging means includes two pairs of light receiving sections. In this case, one pair of light receiving sections each have a light receiving surface oriented perpendicularly to the second axis and parallel to the third axis, and the other pair of light receiving sections each have a light receiving surface oriented perpendicularly to the third axis and parallel to the second axis. The perpendicularities of the spindle axis with respect to the second and third axes are analyzed in the aforesaid manner on the basis of binary images obtained by the respective pairs of light receiving sections.

In the aforesaid arrangements, the light receiving surfaces of the respective light receiving sections of the imaging means are disposed along the spindle axis (first axis). Therefore, the thermal displacement of the spindle described above can also be measured with these arrangements. In accordance with the present invention, the accuracies of the machine tool including the thermal displacement of the spindle and the perpendicularity of the spindle axis can be analyzed by the single accuracy analyzing apparatus. Thus, the analysis of the accuracies of the machine tool can efficiently be achieved at lower costs.

In any of the aforesaid arrangements, the accuracy analyzing apparatus may further comprise a transport device for moving at least the light receiving section of the imaging means between a light receiving position (imaging position) at which the light beam from the light projecting means is received and a stand-by position apart from the light receiving position. With this arrangement, the light receiving section is retracted at the stand-by position during a machining operation of the machine tool and, as required for the accuracy analysis, the light receiving section is positioned at the imaging position for the analysis. Thus, the analysis can be performed whenever necessary, and proper measures can be taken according to the results of the analysis. Therefore, the machine tool can be maintained in good conditions for a long period of time.

DESCRIPTION OF THE PREFERRED EMBODIMENT

Figure 1:
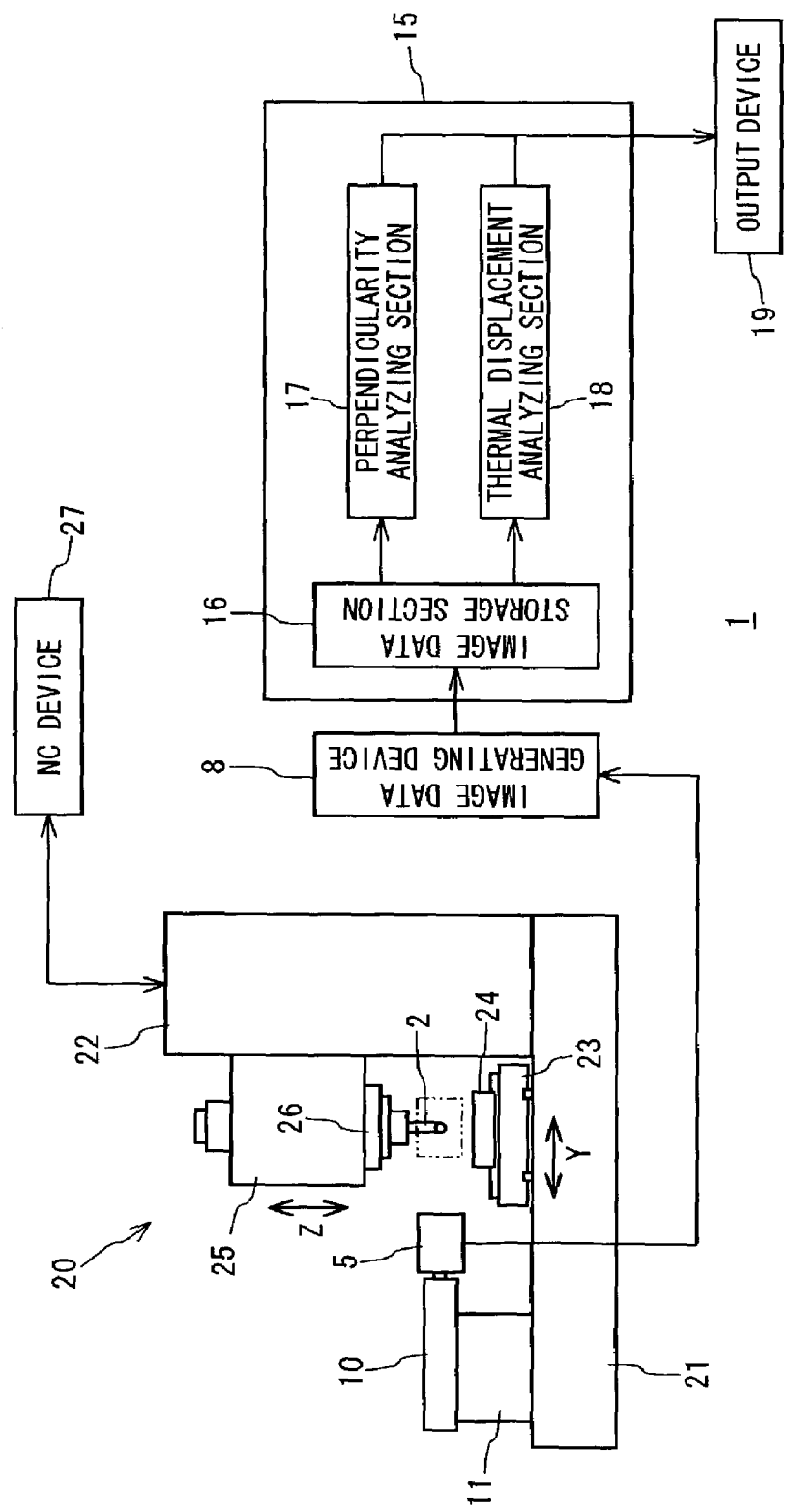
FIG. 1 is a block diagram illustrating the schematic construction of an accuracy analyzing apparatus according to one embodiment of the present invention.

One preferred embodiment of the present invention will hereinafter be described with reference to the attached drawings. FIG. 1 is a block diagram illustrating the schematic construction of an accuracy analyzing apparatus according to the embodiment of the present invention, and FIG. 2 is a plan view of mechanical portions shown in FIG. 1.

Figure 2:
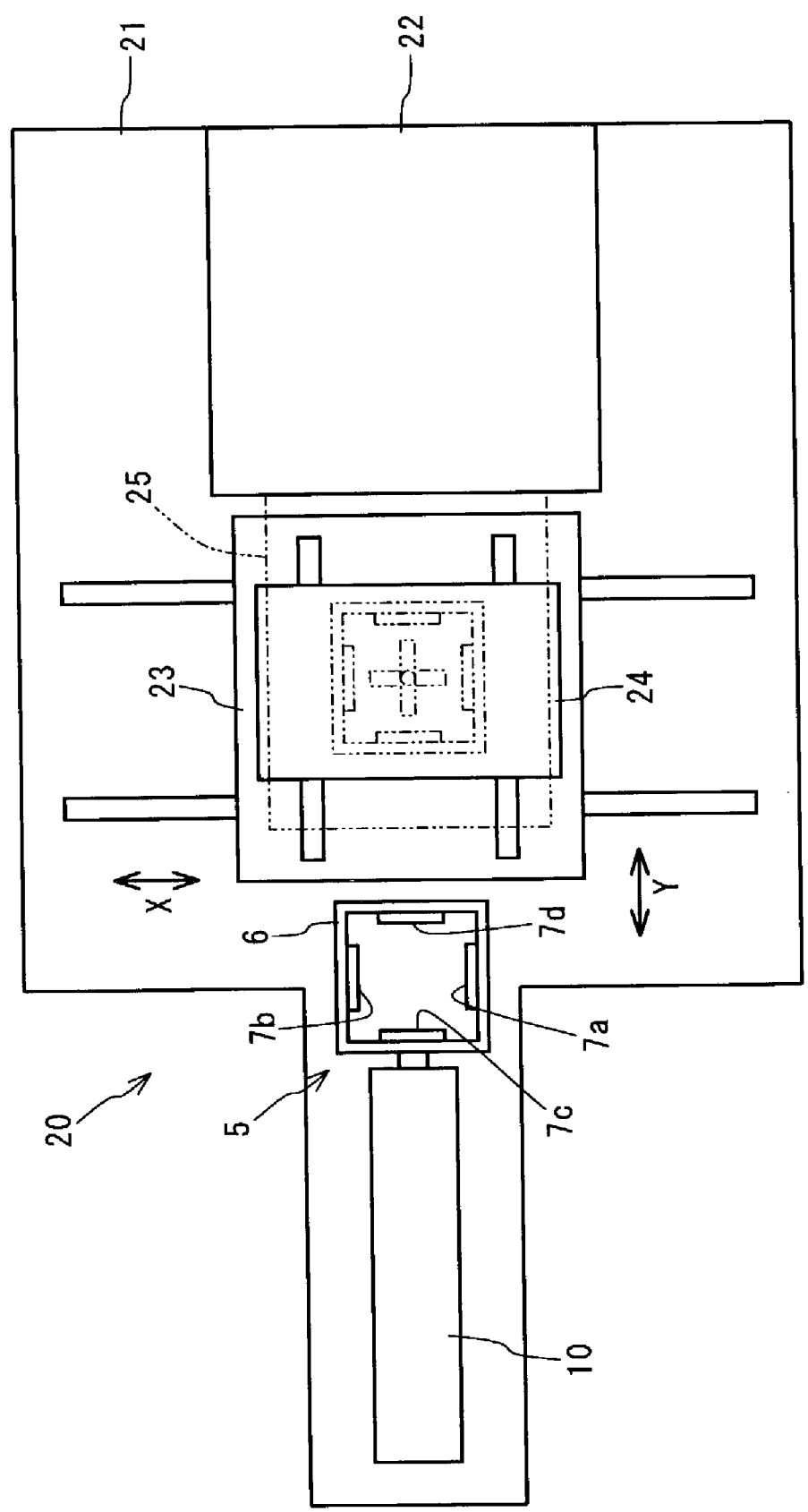
FIG. 2 is a plan view of mechanical portions shown in FIG. 1.

As shown in FIGS. 1 and 2, the accuracy analyzing apparatus 1 according to this embodiment includes a laser oscillator 2 attached to a spindle 26 of a machine tool 20, a light receiving device 5 for receiving a laser beam emitted from the laser oscillator 2, an image data generating device 8 for generating two-dimensional image data on the basis of a signal outputted from the light receiving device 5, a transport device 10 for moving the light receiving device 5 between a light receiving position (indicated by a chain double-dashed line immediately below the spindle 26 in FIG. 2) defined between the spindle 26 and a table 24 and a stand-by position (indicated by a continuous line in FIG. 2) apart from the light receiving position, an analyzer 15 for analyzing accuracies of the machine tool 20 on the basis of the image data generated by the image data generating device 8, and an output device 19 for displaying or printing the results of the analysis performed by the analyzer 15.

In this embodiment, the machine tool 20 is a so-called vertical machining center, and principally includes a bed 21, a column 22 fixed on the bed 21, a saddle 23 provided on the bed 21 movably along an X-axis in a horizontal plane, the table 24 provided on the saddle 23 movably along a Y-axis in a horizontal plane, a spindle head 25 supported by the column 22 in a vertically movable manner (along a Z-axis) and supporting the spindle 26 rotatably about an axis of the spindle 26, a first feed mechanism (not shown) for moving the saddle 23 along the X-axis, a second feed mechanism (not shown) for moving the table 24 along the Y-axis, a third feed mechanism (not shown) for moving the spindle head 25 along the Z-axis, and an NC device 27 for controlling operations of the first feed mechanism, the second feed mechanism and the third feed mechanism (not shown).

Figure 3:
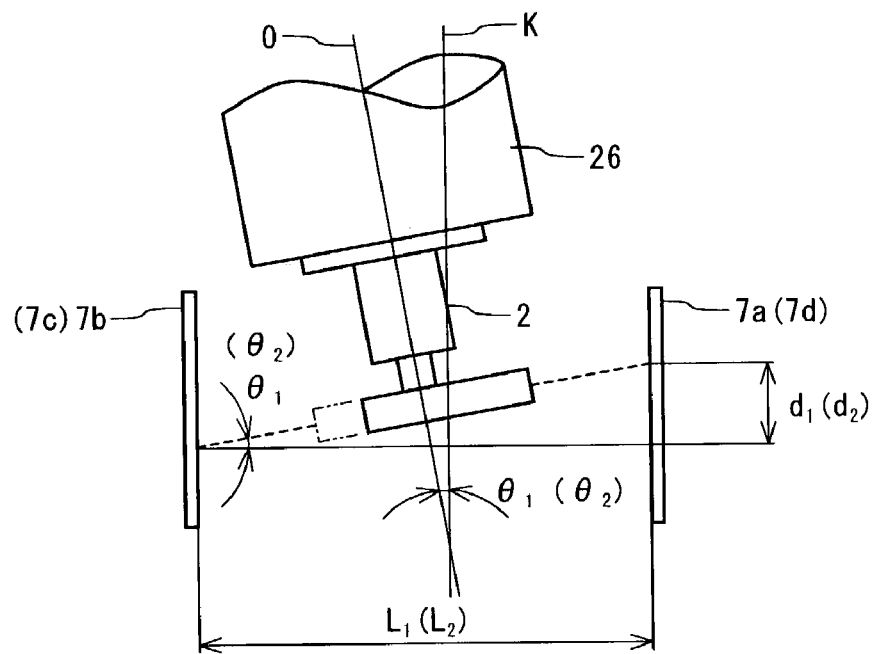
FIG. 3 is an explanatory diagram for explaining a perpendicularity analysis according to this embodiment.

The laser oscillator 2 is adapted to emit a laser beam. As described above, the laser oscillator 2 is attached to the spindle 26, and emits the laser beam which has a light axis extending perpendicularly to the axis o of the spindle 26 as shown in FIG. 3. The laser beam is advantageous in terms of linearity of the light axis and the convergence of the light beam.

The light receiving device 5 includes a housing 6 having an open top and an open bottom and having a rectangular shape as viewed in plan, and CCD panels 7a, 7b, 7c, 7d provided on interior surfaces of the housing 6. The CCD panels 7a, 7b, 7c, 7d each include a plurality of photoelectric converting elements arranged in a two-dimensional array defined by plural lines and plural rows, and are adapted to output voltage signals to the image data generating device 8 from the respective photoelectric elements according to received light amounts.

The CCD panels 7a, 7b each have a light receiving surface perpendicular to the X-axis and parallel to the Y-axis, and are disposed in opposed relation. The CCD panels 7c, 7d each have a light receiving surface perpendicular to the Y-axis and parallel to the X-axis, and are disposed in opposed relation.

Further, the respective CCD panels 7a, 7b, 7c, 7d are precisely disposed so that reference photoelectric converting elements of the CCD panels 7a and 7b (for example, photoelectric converting elements each located at the lowermost position closest to the column 22) are positioned symmetrically with respect to a plane containing the Y-axis and the Z-axis and reference photoelectric converting elements of the CCD panels 7c and 7d (for example, photoelectric converting elements each located at the lowermost and rightmost position when the column 22 is seen from the front side) are positioned symmetrically with respect to a plane containing the X-axis and the Z-axis.

The transport device 10 includes a pneumatic or hydraulic cylinder provided on the bed 21 with the intervention of a support base 11, and a piston rod of the cylinder is attached to the light receiving device 5. The output device 19 includes a CRT and a printer.

The image data generating device 8 is adapted to digitize the voltage signals received from the respective CCD panels 7a, 7b, 7c, 7d, then convert the digitized voltage signals into density levels to generate two-dimensional density image data having the same array configurations as the arrays of the photoelectric converting elements of the CCD panels 7a, 7b, 7c, 7d for the respective CCD panels 7a, 7b, 7c, 7d, and output the generated image data to the analyzer 15. The image data generating device 8 and the CCD panels 7a, 7b, 7c, 7d constitute a CCD camera, which is defined as imaging means in the present invention.

Figure 5:
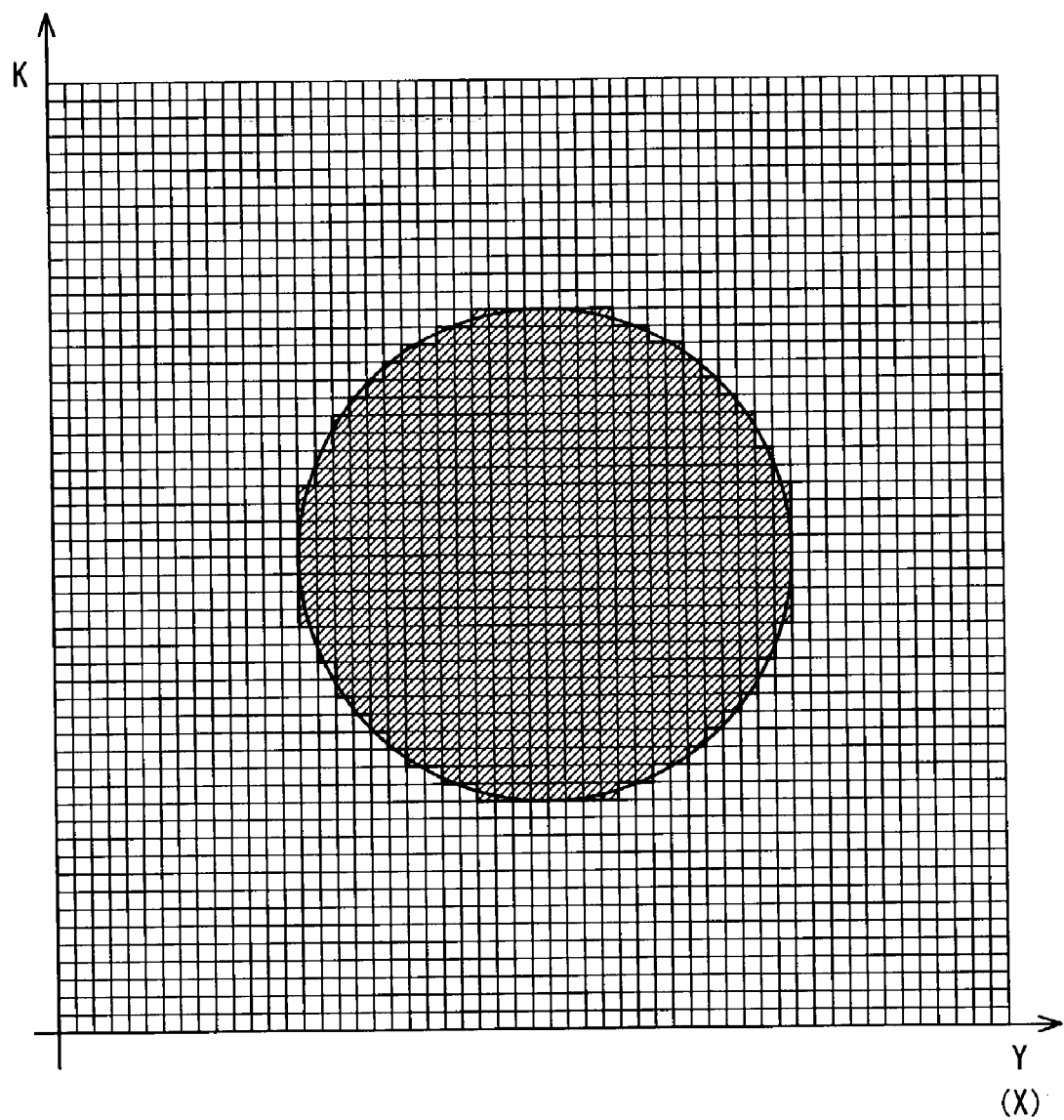
FIG. 5 is an explanatory diagram illustrating a two-dimensional density image generated by an image data generating device on a reverse basis in accordance with this embodiment.

The laser beam emitted from the laser oscillator 2 has a round cross section. Therefore, two-dimensional density images generated by the image data generating device 8 each have a round image portion having a lower density level. An exemplary density image is shown in FIG. 5. In FIG. 5, each square in the image represents a pixel corresponding to a photoelectric converting element. A circle indicated by a bold continuous line corresponds to the outer periphery of the laser beam, and a hatched portion corresponds to the image portion of the laser beam represented by pixels having a lower density level. It is noted that the density levels are illustrated on a reverse basis in FIG. 5 for convenience of explanation.

The analyzer 15 includes an image data storage section 16 for storing the two-dimensional density image data outputted from the image data generating device 8, a perpendicularity analyzing section 17 for analyzing the perpendicularity of the axis of the spindle 26 on the basis of the two-dimensional image data stored in the image data storage section 16, and a thermal displacement analyzing section 18 for analyzing the thermal displacement of the spindle 26 on the basis of the two-dimensional image data stored in the image data storage section 16.

Figure 6:
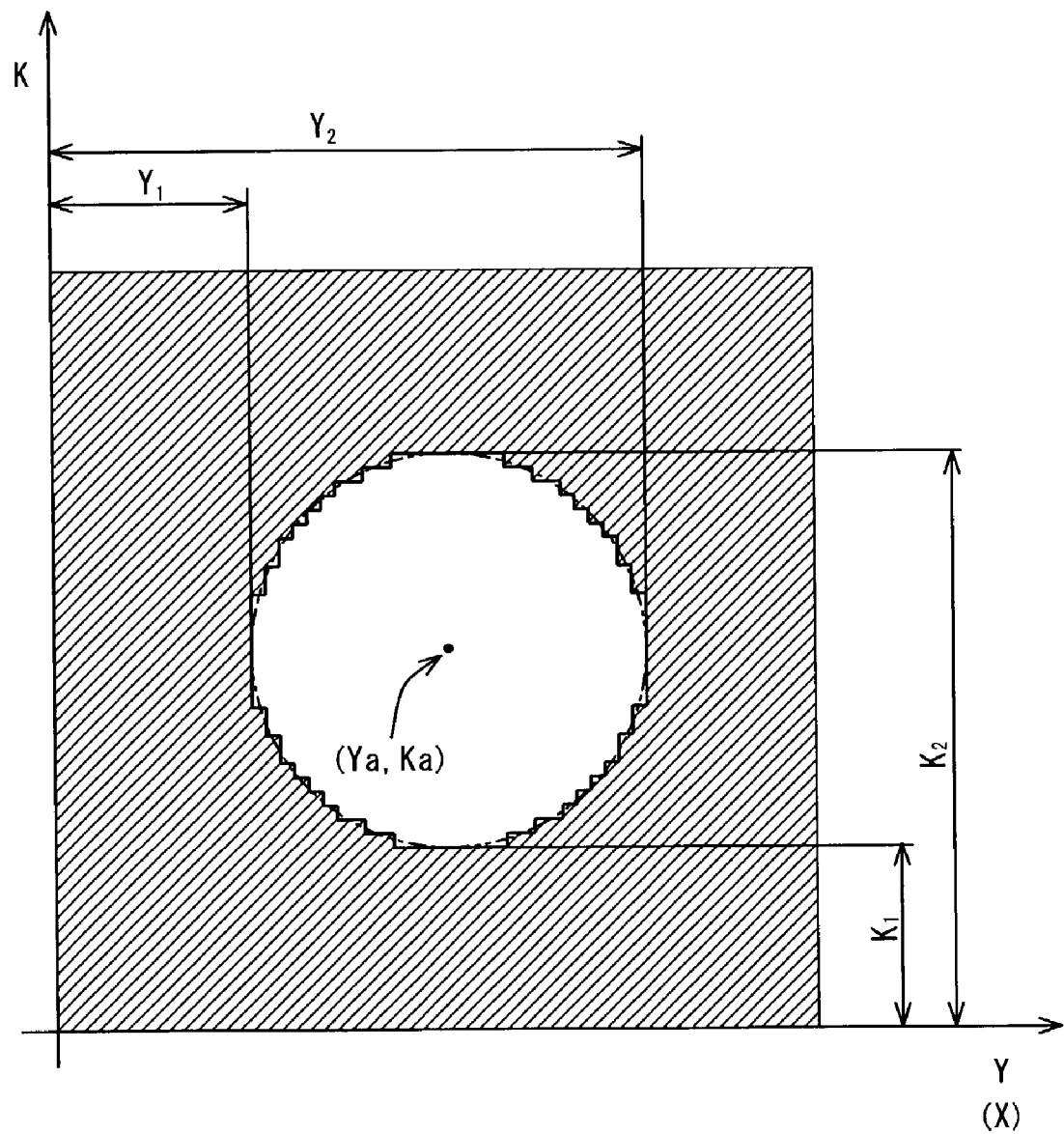
FIG. 6 is an explanatory diagram illustrating a binary image generated by an analyzer according to this embodiment.

The perpendicularity analyzing section 17 and the thermal displacement analyzing section 18 are each adapted to first read the two-dimensional density image data from the image data storage section 16, and binarize the two-dimensional density image data on the basis of a predetermined threshold level to extract the image portion of the laser beam. An image obtained through the binarization of the density image shown in FIG. 5 is shown in FIG. 6. In FIG. 6, the squares indicative of the pixels are not shown, and pixels in a hatched portion are black. Further, a circle indicated by a chain double-dashed line corresponds to the outer periphery of the laser beam.

The perpendicularity analyzing section 17 and the thermal displacement analyzing section 18 are each adapted to analyze the binary images obtained through the binarization in the aforesaid manner to analyze the accuracy of the machine tool 20. Specific processes to be performed by the perpendicularity analyzing section 17 and the thermal displacement analyzing section 18 will be described below.

First, an explanation will be given to an analyzing process to be performed for the analysis of the perpendicularity of the axis of the spindle 26 by the perpendicularity analyzing section 17.

For example, it is assumed that the axis O of the spindle 26 is not perpendicular to the X-axis as shown in FIG. 3, i.e., the axis 0 is inclined at an angle $\theta_1$ with respect to a virtual axis K defined as extending perpendicularly to the X-axis and the Y-axis. The center position of a binary image obtained by causing the CCD panel 7a to receive the laser beam when the spindle 26 is indexed at such a rotational position that the laser beam is directed in a plane containing the X-axis and the center position of a binary image obtained by causing the CCD panel 7b to receive the laser beam after the spindle 26 is rotated by 180 degrees are offset from each other by a distance $d_1$ with respect to the axis direction (i.e., the virtual axis K direction) perpendicular to the X-axis correspondingly to the inclination of the axis O.

Therefore, the inclination angle $\theta_1$ of the axis O with respect to the virtual axis K can be calculated on the basis of the offset amount $d_1$ and a preliminarily measured distance $L_1$ between the light receiving surfaces of the CCD panels 7a and 7b. That is, the inclination angle $\theta_1$ of the axis O is calculated from the following expression:

$$\theta_1 = \tan^{-1}(d_1/L_1)$$

wherein $d_1$ is the offset amount and $L_1$ is the distance between the light receiving surfaces of the CCD panels 7a and 7b.

The perpendicularity analyzing section 17 reads the two-dimensional density image data of the laser beam imaged by the CCD panels 7a, 7b from the image data storage section 16, binarizes the two-dimensional density image data, then computes the center positions of the resulting binary images (white images), and calculates a difference between the center positions for determination of the offset amount $d_1$.

The center positions of the binary images can each be computed in the following manner. As shown in FIG. 6, the binary image is scanned in a raster direction for detection of positions of white pixels located on a boundary of the white image with respect to an X-direction (the X-axis) and a K-direction (the virtual axis K), and the coordinates (Xa, Ka) of the center position of the white image are determined on the basis of the boundary positions.

The coordinates (Xa, Ka) of the center position are calculated from the following expressions:

$$Xa=(X_1+X_2)/2$$

$$Ka=(K_1+K_2)/2$$

wherein $X_1$ and $X_2$ are the boundary positions with respect to the X-direction, and $K_1$ and $K_2$ are the boundary positions with respect to the K-direction.

Figure 7:
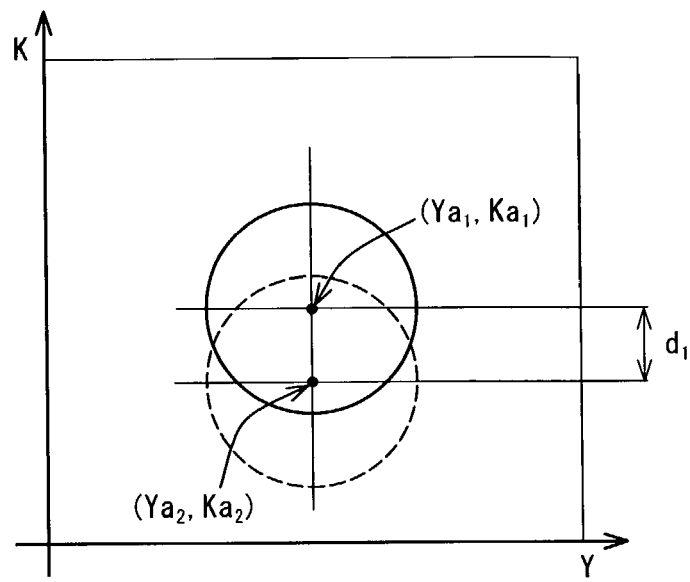
FIG. 7 is an explanatory diagram for explaining a process to be performed by a perpendicularity analyzing section according to this embodiment.

An image obtained by overlapping the binary image of the laser beam obtained via the CCD panel 7a with the binary image of the laser beam obtained via the CCD panel 7b is shown in FIG. 7. In FIG. 7, the outer periphery of the binary image of the laser beam obtained via the CCD panel 7a is indicated by a continuous line, and the outer periphery of the binary image of the laser beam obtained via the CCD panel 7b is indicated by a dashed line.

The perpendicularity analyzing section 17 reads the two-dimensional density image data obtained via the CCD panels 7a, 7b before and after the rotation of the spindle 26 from the image data storage section 16, and binarizes the two-dimensional density image data on the basis of the predetermined threshold level to provide binary image data. Then, the perpendicularity analyzing section 17 computes the center positions of the respective binary images on the basis of the binary image data, and calculates the offset amount $d_1$ with respect to the virtual axis K direction on the basis of the computed center positions. On the basis of the offset amount $d_1$ thus calculated, the perpendicularity analyzing section 17 calculates the inclination angle $\theta_1$ of the axis O.

The aforesaid process is applicable to a case where the axis O of the spindle 26 is not perpendicular to the Y-axis. In this case, an offset amount $d_2$ with respect to the virtual axis K direction is calculated on the basis of the center position of a binary image obtained by causing the CCD panel 7c to receive the laser beam when the spindle 26 is indexed at such a rotational position that the laser beam is directed in a plane containing the Y-axis and the center position of the binary image obtained by causing the CCD panel 7d to receive the laser beam after the spindle 26 is rotated by 180 degrees. On the basis of the offset amount $d_2$, the inclination angle $\theta_2$ of the axis O with respect to the virtual axis K is calculated in the same manner as described above (see FIG. 3).

Next, an explanation will be given to an analyzing process to be performed for the analysis of the thermal displacement of the spindle 26 by the thermal displacement analyzing section 18.

Figure 4:
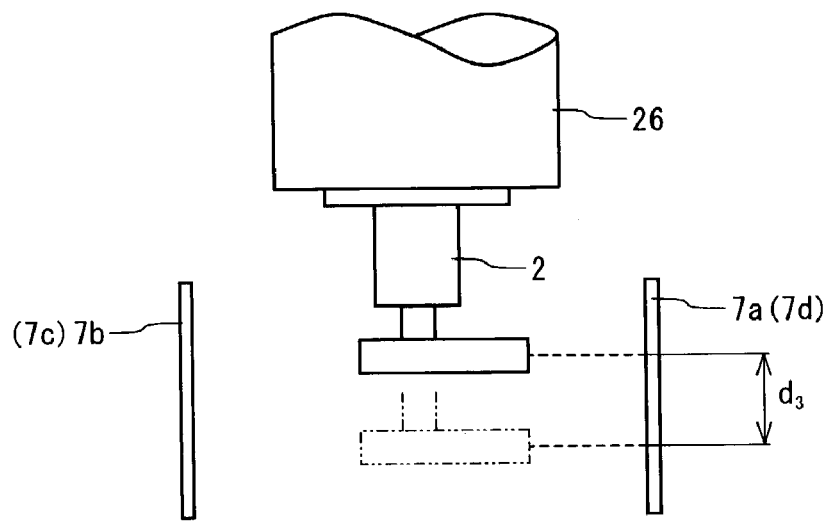
FIG. 4 is an explanatory diagram for explaining a thermal displacement analysis according to this embodiment.

When the machine tool 20 is operated for a predetermined period, for example, the spindle 26 is thermally expanded by heat generation of bearings holding the spindle 26 thereby to be displaced or extended axially thereof. The thermally displaced state of the spindle 26 is shown in FIG. 4. When the spindle 26 is extended with the spindle head 25 positioned at a fixed position with respect to the Z-axis by the third feed mechanism (not shown) as shown in FIG. 4, the center position of a binary image obtained via the CCD panel 7a before the thermal displacement and the center position of a binary image obtained via the CCD panel 7a after the thermal displacement are offset from each other by a thermal displacement amount $d_3$ along the Z-axis (along the axis O of the spindle 26).

Figure 8:
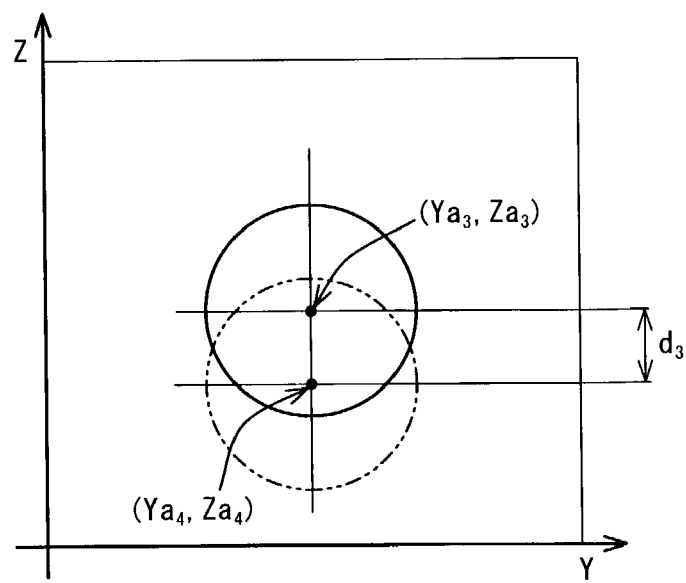
FIG. 8 is an explanatory diagram for explaining a process to be performed by a thermal displacement analyzing section according to this embodiment.

An image obtained by overlapping the binary image of the laser beam obtained via the CCD panel 7a before the operation of the machine tool 20 with the binary image of the laser beam obtained via the CCD panel 7a after a lapse of the predetermined period from the start of the operation of the machine tool 20 is shown in FIG. 8. In FIG. 8, the outer periphery of the binary image of the laser beam obtained before the operation is indicated by a continuous line, and the outer periphery of the binary image of the laser beam obtained after the operation is indicated by a chain double-dashed line.

The thermal displacement analyzing section 18 reads two-dimensional density image data obtained via the CCD panel 7a before and after the machine tool 20 is operated for the predetermined period with the spindle head 25 positioned at the fixed position with respect to the Z-axis from the image data storage section 16, and binarizes the two-dimensional density image data on the basis of the predetermined threshold level to obtain binary image data. Then, the thermal displacement analyzing section 18 computes the center positions of the respective binary images on the basis of the binary image data, calculates a difference between the center positions with respect to the Z-axis. Thus, the thermal displacement of the spindle 26 is calculated.

Next, an explanation will be given to how to analyze the perpendicularity of the spindle axis O and the thermal displacement of the spindle 26 with the use of the accuracy analyzing apparatus 1 having the aforesaid construction according to this embodiment. It is assumed that the light receiving device 5 is present at a stand-by position (home position) and the spindle head 25 is located at a sufficiently high level.

After the light receiving device 5 is moved to the light receiving position by the transport device 10, the spindle head 25 with the laser oscillator 2 attached to the spindle 26 is driven to be moved downward by the third feed mechanism (not shown) until the laser oscillator 2 reaches the inside of the housing 6 of the light receiving device 5.

Then, the spindle 26 is rotated to be indexed at such a rotational position that the laser beam emitted from the laser oscillator 2 is directed in the plane containing the X-axis, and the laser beam is emitted from the laser oscillator 2 for a predetermined period. The emitted light beam is imaged by the CCD panel 7a, and two-dimensional density image data of the laser beam is generated by the image data generating device 8 on the basis of signals from the CCD panel 7a and stored in the image data storage section 16.

The spindle 26 is thereafter rotated by 90 degrees at a time and, after every 90-degree rotation, the laser beam is emitted for a predetermined period and imaged by the CCD panels 7b, 7c, 7d. Data of two-dimensional density images of the laser beam obtained at the respective rotation angles is generated by the image data generating device 8, and stored in the image data storage section 16.

After the two-dimensional density image data is obtained, the spindle head 25 and the light receiving device 5 are moved back to their initial positions.

For the analysis of the perpendicularity of the spindle axis O, the two-dimensional density image data is obtained in the aforesaid manner at the assembly and adjustment of the machine tool and thereafter as required. For the analysis of the thermal displacement of the spindle 26, the two-dimensional density image data is obtained in the aforesaid manner before the operation of the machine tool 20 and at predetermined time intervals after the start of the operation of the machine tool 20 and, thereafter, as required.

After the two-dimensional density image data is thus obtained, the perpendicularity of the spindle axis O and the thermal displacement of the spindle 26 are analyzed in the aforesaid manner by the analyzer 15. For the analysis of the thermal displacement, the two-dimensional density image data obtained via any of the CCD panels 7a, 7b, 7c, 7d may be used.

As detailed above, the accuracies of the machine tool 20 including the perpendicularity of the spindle axis O and the thermal displacement of the spindle 26 can be analyzed solely by the accuracy analyzing apparatus 1 according to this embodiment. Therefore, the analysis can highly efficiently be achieved at lower costs.

Since the thermal displacement of the spindle 26 can directly be measured, the analysis of the thermal displacement can accurately be achieved. Therefore, a correction for the thermal displacement can correspondingly be made with a higher level of accuracy.

Further, the light receiving device 5 can be moved between the stand-by position and the light receiving position by the transport device 10. Therefore, the light receiving device 5 can be located at the stand-by position during the machining operation of the machine tool 20 and, as required for the accuracy analysis, moved to the light receiving position. Hence, the analysis can be performed whenever necessary, and proper measures can be taken according to the results of the analysis. Accordingly, the machine tool 20 can be maintained in good conditions for a long period of time.

While the present invention has thus been described by way of the embodiment thereof, the invention is not limited to this specific embodiment, but may be embodied in any other conceivable ways. Although the accuracy analyzing apparatus according to the aforesaid embodiment is adapted for the analysis of the accuracies of the vertical machining center 10, the invention is applicable to horizontal machining centers and other equivalent types of machine tools.

In the aforesaid embodiment, the laser oscillator 2 is manually attached to the spindle 26, but may be accommodated in a tool magazine typically provided in the machining center, and automatically attached to the spindle 26 by an automatic tool changer.

In the aforesaid embodiment, the analyzer 15 and the image data generating device 8 are separately provided, but may be constructed as a unitary device.

What is claimed is:

1. An accuracy analyzing apparatus for a machine tool comprising a table, a spindle and a feed mechanism for relatively moving the table and the spindle along orthogonal three axes including a first axis extending along a spindle axis and second and third axes perpendicular to each other and perpendicular to the first axis, the accuracy analyzing apparatus comprising:

light projecting means attached to the spindle for emitting a light beam having a light axis perpendicular to the spindle axis;

imaging means having a light receiving section disposed in the vicinity of the light projecting means for receiving the light beam emitted from the light projecting means by the light receiving section and generating two-dimensional image data; and analyzing means for analyzing an accuracy of the machine tool on the basis of the generated image data.

2. A machine tool accuracy analyzing apparatus as set forth in claim 1, wherein the analyzing means analyzes displacement of the spindle.

3. A machine tool accuracy analyzing apparatus as set forth in claim 1, wherein the imaging means comprises at least one pair of light receiving sections which are disposed in opposed relation across the light projecting means.

4. A machine tool accuracy analyzing apparatus as set forth in claim 3, wherein the analyzing means analyzes perpendicularity of the spindle axis with respect to at least one of the second and third axes.

5. A machine tool accuracy analyzing apparatus as set forth in claim 1, wherein the light receiving section of the imaging means comprises a plurality of photoelectric converting elements arranged in a two-dimensional array.

6. A machine tool accuracy analyzing apparatus as set forth in claim 1, wherein the light projecting means comprises a laser oscillator for emitting a laser beam.

7. A machine tool accuracy analyzing apparatus as set forth in any of claims 1 to 6, further comprising a transport device for moving at least the light receiving section of the imaging means between a light receiving position at which the light beam from the light projecting means is received and a stand-by position apart from the light receiving position.

* * * * *